Dec. 17, 1968   D. R. ABFALTER   3,416,677
TAILGATE LIFT DEVICE
Filed June 3, 1966   4 Sheets-Sheet 1
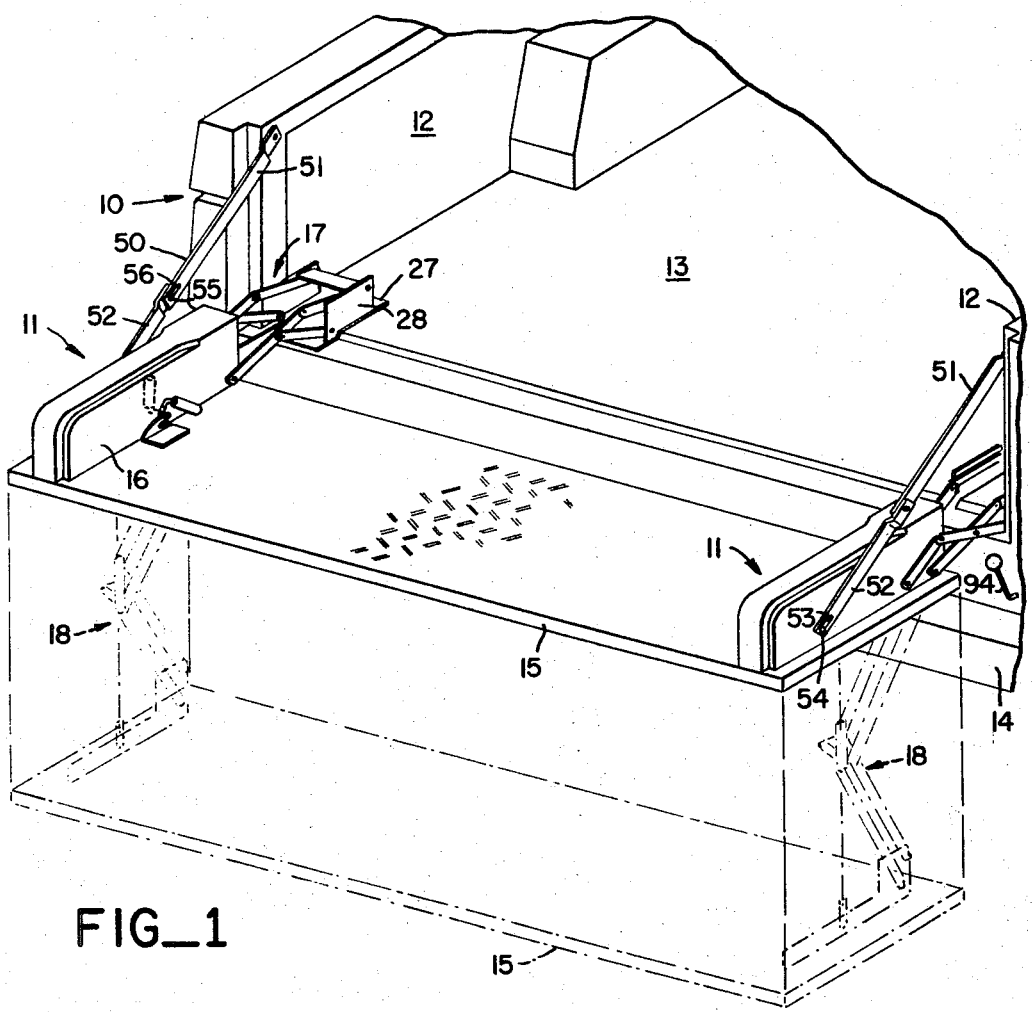
FIG_1
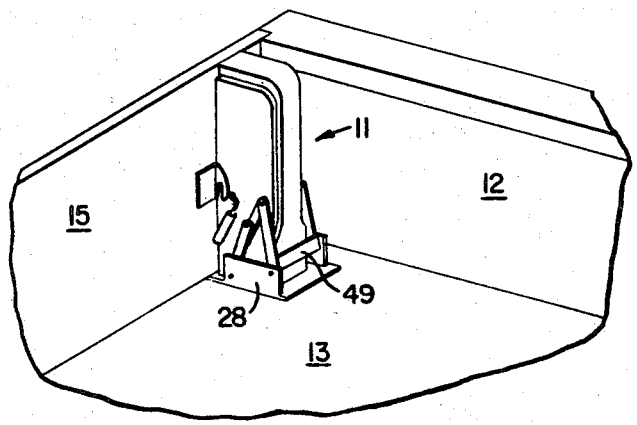
FIG_2
INVENTOR.
DUANE R. ABFALTER
BY
Owen, Wickersham & Erickson
ATTORNEYS Dec. 17, 1968     D. R. ABFALTER     3,416,677
TAILGATE LIFT DEVICE
Filed June 3, 1966     4 Sheets-Sheet 2
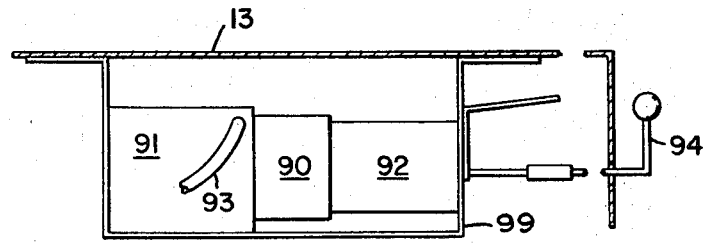
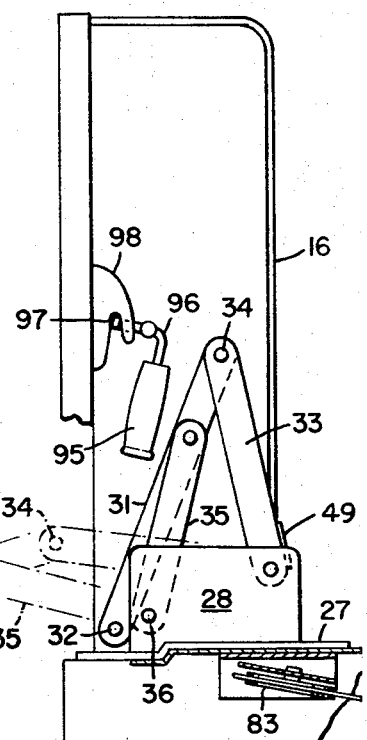
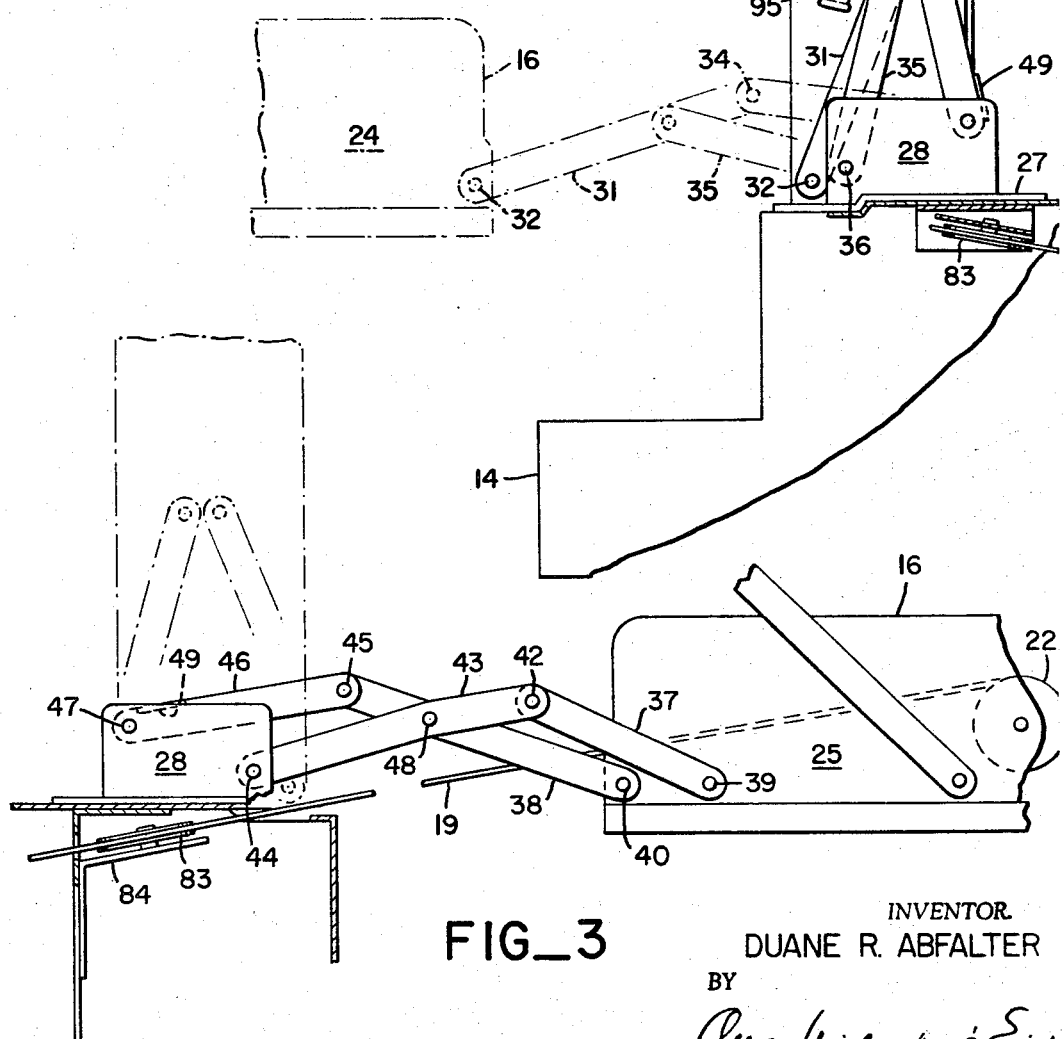
INVENTOR.
DUANE R. ABFALTER
BY
*Owen, Wickersham & Erickson*
ATTORNEYS Dec. 17, 1968  D. R. ABFALTER  3,416,677
TAILGATE LIFT DEVICE
Filed June 3, 1966  4 Sheets-Sheet 3
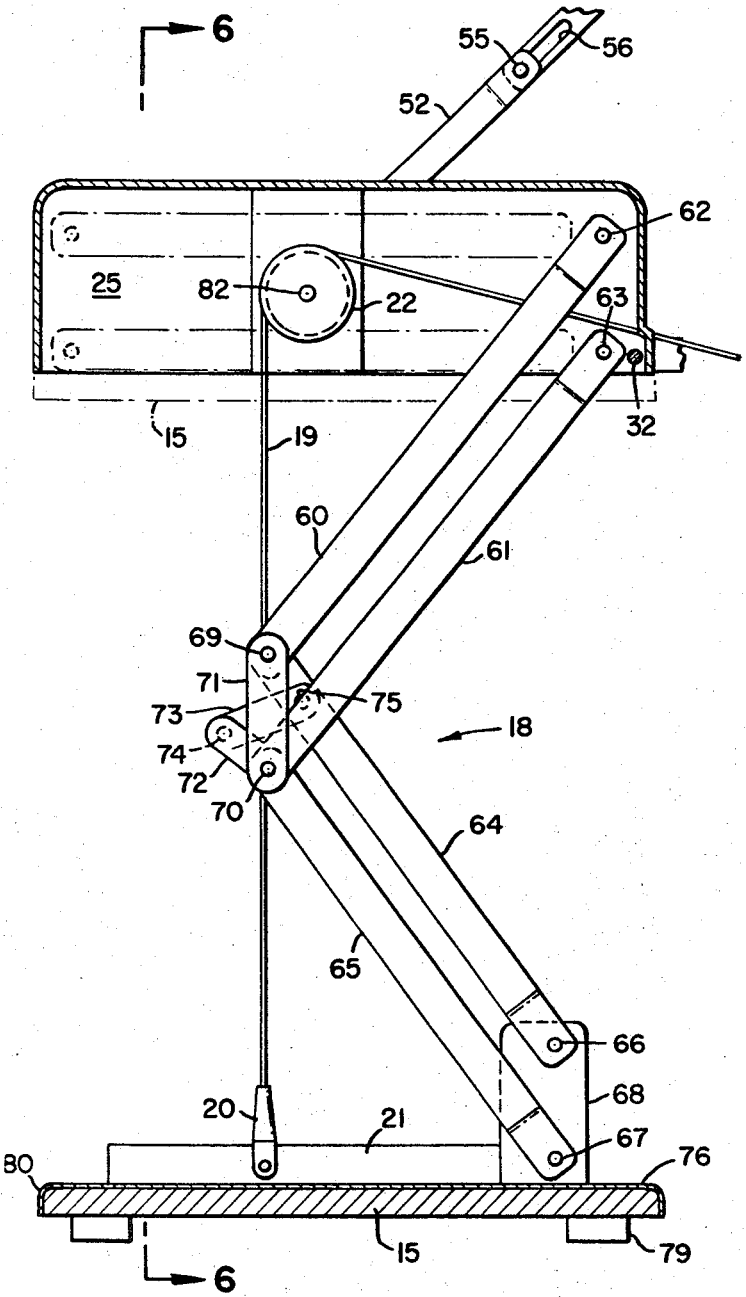
FIG_5
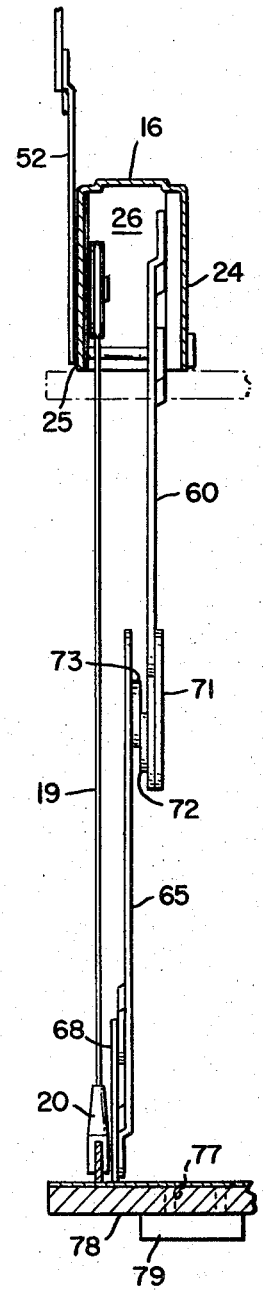
FIG_6
INVENTOR.
DUANE R. ABFALTER
BY
Owen, Wickersham & Erickson
ATTORNEYS

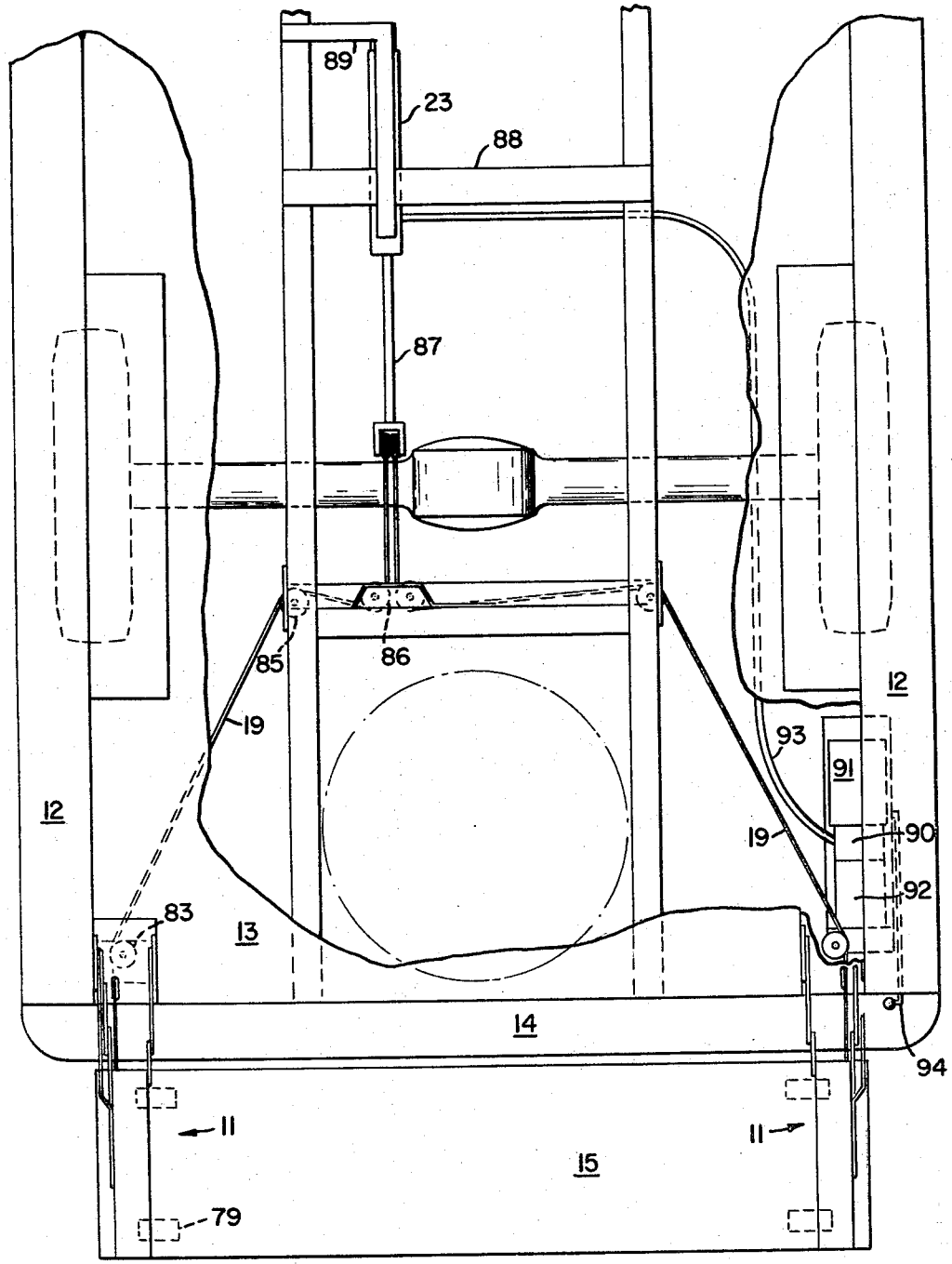
FIG_8

United States Patent Office

3,416,677
Patented Dec. 17, 1968

3,416,677
TAILGATE LIFT DEVICE
Duane R. Abfalter, 19275 Arnold Drive,
Sonoma, Calif. 95476
Filed June 3, 1966, Ser. No. 555,040
15 Claims. (Cl. 214—75)

ABSTRACT OF THE DISCLOSURE

A tailgate lifting device attachable to a truck type vehicle as by a pair of housing members hingedly attached to the vehicle at each side. Suspended from each housing member is a parallel linkage and a platform is supported between linkages. The linkages are capable of extension to a level below the bed of the vehicle and retraction at which time the platform is at the level of the vehicle bed. The housing members are of such dimension as to house the linkages when in retracted position.

---

This invention relates to a lifting or loading device for truck type vehicles, and more particularly to a combined lifting device and tailgate for such vehicles.

Tailgate lifting devices heretofore were utilized on relatively large, heavy freight-carrying truck vehicles. On such trucks, the rear end of the cargo bed usually extended rearwardly far enough so that no interference was encountered from any other portions of the truck body when the lifting device was lowered. However, with smaller trucks and especially the type commonly referred to as pickup trucks, an interference problem arose because usually such trucks utilize a large bumper structure that projects rearwardly from the truck frame. Thus, the problem, in providing a lifting tailgate device for these trucks was to provide a tailgate that would extend outwardly away from the truck bed far enough so that its vertical travel up and down would clear interfering truck structure that projected rearwardly. One principal object of the present invention is to provide a solution to this problem.

Another object of the present invention is to provide a tailgate lifting device that is particularly adaptable for relatively small type vehicles such as pickup trucks and which can be provided on the vehicle either as original equipment or as a kit for later installation on trucks of various sizes, models and makes.

Still another object of the present invention is to provide a tailgate lifting device of the aforesaid type which is unusually strong and powerful and yet is simple, light and comprised of a relatively few components. An important feature of my tailgate device is that it can be easily installed on various stock truck vehicles with a relatively small amount of labor, and moreover, it is particularly swell adapted for ease and economy of manufacture.

A more specific object of my invention is to provide a tailgate lifting device for small trucks in which a pair of carrier support members are hinged to the truck bed and swing outwardly away from its rearward edge as the tailgate is pulled down. Supported by each of these hinged members is a linkage means which is also attached to the tailgate at its lower end and operates in such a manner that the tailgate is always lowered and raised vertically from the horizontally extended support members. The power for lifting the tailgate is preferably provided by a hydraulic actuator installed beneath the truck bed, and when the tailgate is raised, the controlling linkages fold neatly into the support members.

Other objects, advantages and features of my invention will become apparent from the following detailed description of one embodiment thereof presented in accordance with 35 U.S.C. § 112.

In the drawings:

FIG. 1 is a fragmentary view in perspective of the rear end of a truck showing a lifting tailgate device according to the principles of the present invention, the lines in phantom show the tailgate in the down position for loading;

FIG. 2 is a fragmentary view in perspective from inside a truck showing the tailgate device in the up and closed position;

FIG. 3 is an enlarged fragmentary outside view in elevation showing details of the hinge system with a carrier support means extended;

FIG. 4 is an enlarged fragmentary inside view of the hinge of FIG. 3;

FIG. 5 is an enlarged view in elevation and in section showing the carrier support means and the attached linkage means down and extended;

FIG. 6 is a view in section along line 6—6 of FIG. 5;

FIG. 7 is an enlarged plan view showing the arrangement of the power drive means beneath the truck bed;

FIG. 8 is a fragmentary plan view of the truck shown in FIG. 1, with the tailgate lifting device in the down position.

Referring to the drawing, FIG. 1 shows a rear end portion of a truck 10 utilizing a lifting tailgate assembly 11 embodying the principles of the present invention. As shown, our invention is particularly adaptable for installation on an open bed "pickup" type of truck having sidewalls 12 on opposite sides of a bed floor 13. Such trucks are also usually equipped with a large bumper 14 that projects rearwardly well beyond the rear edge of the bed floor 13. As illustrated, the lifting tailgate 15 of the overall assembly 11 according to our invention is stowed in its normal position when in the up position, as seen in FIG. 2, but when in the down position, it extends well rearwardly of the edge of the bed floor 13 and thus can be lowered to the ground in a vertical path that avoids any interference with the bumper 14.

In broad terms the tailgate assembly 11 comprises a pair of carrier housings 16 which are connected to the truck bed floor 13 at spaced apart locations by a pair of hinges 17. Each carrier housing 16 is open along one side and provides a mounting support for a hinge 17 as well as a storage compartment for a foldable control linkage 18 (FIG. 5). These control linkages are each pivotally attached at their lower ends to the tailgate 15, and, as will be seen by the detailed description that follows, they provide a means for lowering the tailgate vertically. They also provide the necessary guidance, stability and strength for the tailgate 15 as it is being lifted and lowered. In the fully retracted position as shown in FIG. 1, the linkages 18 fold together and are stowed neatly and out of sight within their respective carrier housings 16 which are thus engaged flush against the upper surface of the tailgate 15. Power for lifting the tailgate and drawing it up from an extended position towards the carrier housings is provided through a pair of cables 19. Each cable 19 is attached by a fitting at one end to a transverse support member 21 fixed to the tailgate 15 and extends around a pulley 22 rotatably mounted within the associated carrier housing. From the carrier housings the cables 19 extend into the truck or underneath the truck bed, where they are connected to a controllable driving means, shown in FIG. 3 as a hydraulic actuator 23.

Describing now our tailgate assembly 11 in greater detail, the carrier housings 16, as shown in FIGS. 5 and 6, are preferably cast as integral units from a relatively light metal and have a generally oblong shape with spaced apart side wall members 24 and 25 forming an elongated cavity 26. Near one end of the latter wall members, each housing 16 is connected to one end of a hinge 17 which is supported at its other end on the truck bed 13 by a reinforcing plate 27 having a pair of upright spaced apart flanges 28, as seen in FIG. 1. Each hinge 17 comprises a unique linkage arrangement which enables the attached carrier housing 16 to stow itself neatly in the corner of the truck bed. In this stowed or tailgate closed position, as shown in FIG. 2, the folded hinge conveniently is located closely adjacent to the carrier housing so that no projecting link members can get in the way of truck cargo and be damaged or take up unnecessary space. Yet, when the tailgate is pulled down from the stowed position, it does not merely rotate about a fixed hinge axis. Instead, due to a double action of the hinge 17, the tailgate 15 extends outwardly from the truck bed as it also rotates from a vertical to a horizontal position. As best shown in FIGS. 3 and 4 each hinge 17 has inner and outer link portions 29 and 30 which are connected at their opposite ends to a flange 28 of the truck bed mounting plate 27 and to the carrier housing 16. The inner hinge portion 29 (FIG. 4) is comprised of three link members including a first and longest link 31 pivotally connected at one end by a pin 32 secured by the side walls 24 and 25 of the housing 16, a second link 33 pivotally connected to a pin 34 at the other end of the first link and to one end of a mounting plate flange 28, and a third link 35 pivotally connected by a pin 36 at one end to the other end of the mounting plate flange 28 and to the first link 31 between the pins 32 and 34. The outer hinge portion 30 (FIG. 3) comprises four link members including a pair of first links 37 and 38 of somewhat different lengths and pin connected at their ends 39 and 40 to the outer housing sidewall 25. The shorter link 37 of the latter two is pin connected at its other end 42 to a slightly angular shaped link 43 which is pin connected at its opposite end 44 to a mounting plate flange 28. The longer link 38 of the two connected to the housing is pin connected at its opposite end 45 to another link 46 which is connected at its opposite end 47 to the other side of the same mounting flange. This longer link 46 is also pivotally connected by a pin 48 between its ends to the bent link 43 between its ends. A backing plate 49 (FIG. 2) is fixed to the rearward links 33 and 46 for the inner and outer hinge components so that the latter will articulate in unison as the hinge is operated. The lengths of the aforesaid cooperating link members and their pin connections are such that the hinge folds neatly around the housing in the stowed or tailgate "up" position, and in the tailgate "down" position, the carrier housings 16 extend outwardly from the truck bed 15 and are supported with their bottoms (and thus the upper surface of the tailgate 15) coincident with a substantially horizontal plane which is the same as the truck bed. When in the down or horizontal position the carrier housings are supported by a pair of extendable support arms 50 which are each comprised of two connected members 51 and 52 (FIG. 1). The first member 51 is pivotally connected at one end to the inside of the truck sidewall 12 and the second member 52 is connected by means of a slot 53 to a pin 54 near the outer end of the carrier housing. These latter two members 51 and 52 are joined together by another pin and slot connection 55 and 56. When the housings 16 are pulled down to the horizontal position the scissors links 50 become fully extended with each of their pins bearing at one end of its associated slot.

Another important feature of our tailgate assembly 11 is the carrier linkages 18 which interconnect the carrier housing 16 and the tailgate 15. As shown in FIGS. 5 and 6, each of these linkages is comprised of an upper pair of top and bottom control bars 60 and 61 which are pivotally connected at their upper ends to spaced apart studs or pins 62 and 63 anchored to the inside of an inner sidewall 24 of a carrier housing 16. Another lower pair of top and bottom control bars 64 and 65, both having a length equal to the upper control bars are pivotally connected to a pair of pins 66 and 67 anchored to an upright bracket 68 fixed to the tailgate 15. As their other ends the top upper control bar 60 is connected to the top lower control bar 64 by a pin 69 and the bottom upper bar 61 is connected to the bottom lower bar 65 by a pin 70. Another link 71 is connected to the pins 69 and 70 which are spaced apart the same distance as the upper mounting pins 62 and 63 and the lower mounting pins 66 and 67. Thus, the upper and lower pairs of control bars form two parallelogram linkages. When these two linkages spread apart and close relative to a bisecting horizonal plane at the same anglar rate as the tailgate 15 is lowered and raised, the tailgate will move precisely along a path perpendicular to this bisecting plane and thus vertically to the ground, thereby avoiding any interference with the truck bumper. This equal angular movement of the parallelogram control linkages and the resultant vertical travel of the tailgate is accomplished by a coordinating linkage comprised of a stationary arm 72 fixed to the end of the bottom upper control bar 61 and a floating link 73 pivotally connected by a pin 74 to the end of the stationary arm 72 and by a pin 75 to the upper lower control arm 64 at a predetermined distance from its end. The action of this coordinating linkage in maintaining equal angular movement of the upper and lower control arms may be readily seen in in FIG. 5. As the upper arms 60 and 61 move clockwise, for example, they remain parallel by virtue of the end connecting link 71. The stationary arm 72 also moves clockwise about the pin 70 and, through the floating link 73 it forces the top arm 64 of the lower control pair to move counterclockwise. Since the distance between the pins 70 and 74 for the stationary link 72 is the same as the distance between the pins 69 and 75 on the lower top arm 64, the angular movement of the two control linkages is the same and absolute vertical travel of the tailgate 15 results.

The tailgate 15 is preferably provided with a metal cover plate 76 of a suitable thickness and surface treatment to provide it with sufficient strength, rigidity and wear resistance. For situations where the tailgate assembly is to be installed as a kit on stock pickup trucks, the original truck tailgate can be utilized. In such installations this original gate is removed from its conventional hinges and the rigid cover plate 76 is attached by means of a series of bolts 77 near its opposite ends, as shown in FIG. 6. These bolts are preferably anchored to a metal plate 78 on the outside of the tailgate and bonded to each plate is a hard rubber pad 79, thereby providing a series of spaced apart protectors for the tailgate when it engages the ground.

Along the top edge of the protective cover plate 76 it is preferably bent to form a longitudinally extending lip 80 that curves partially around the edge of the original tailgate structure. Other forms of tailgate structure can be utilized within the scope of the invention and their structural details may vary depending on the type of truck on which the lifting tailgate assembly 11 is to used.

As stated earlier, the means 19 attached to its opposite includes the flexible cables 19 attached to its opposite ends. These cables extend upward around the pulley 22 which is rotatably supported on a pin 82 extending from the outer sidewall 25 of each carrier housing. After passing partially around the pulley 22 the cable extends through an opening in one end of the carrier housing, through the truck body wall and underneath the truck for connection with a suitable power drive means. In the embodiment shown (FIG. 3) each cable 19 passes partially around another pulley 83 which is rotatably supported on a bracket 84 located underneath the rear end of the truck bed and beneath the reinforcing plate 27. Extending forward each cable then passes partially around a third set of spaced apart pulleys 85 (FIG. 8) and finally partially around a fourth set of more closely spaced apart pulleys 86. The ends of these cables 19 are connected to a means for pulling the cables at a constant rate for a distance and with a force that is sufficient to raise the tailgate from a fully extended position. In the embodiment shown, the ends of the cables are connected to a movable ram 87 of the hydraulic actuator 23, which is fixed to the truck frame in a suitable manner such as by a pair of bracket members 88 and 89 that are bolted or welded thereto.

The guiding pulleys 85 and 86 may be fixed to the underside of the truck in any suitable manner, as by bolting to its frame or other suitable structure. The arrangement shown is merely illustrative and various arrangements can be utilized within the scope of the invention to accommodate different truck arrangements and performance requirements.

The hydraulic pressure for use by the actuator 23 is furnished by a conventional pump 90 supplied by a hydraulic fluid reservoir 91 and driven by an electric motor 92, the hydraulic fluid being supplied to the actuator through a conduit 93. The pump, reservoir and motor are mounted in a compact arrangement on a supporting plate 99 that is fixed to the truck frame or the underside of the truck bed 13. The motor 92 derives its electrical power (e.g., 12 volts) through a lead to the appropriate terminal in the truck electrical system and a control handle 94 connected to the motor preferably extends through the truck body at its rear end and is thereby accessible alongside of the lifting tailgate (see FIG. 7). An additional control (not shown) could be provided inside the truck cab if desired. It should be apparent that other forms of power drive means could be utilized within the scope of the invention although the arrangement shown has produced excellent results and has many advantages such as reliability and ease of maintenance.

When the actuator 23 is fully retracted, the cables 19 have drawn the tailgate 15 up flush against the bottoms of the carrier housings 16. However, it is not necessary to maintain hydraulic pressure to hold the tailgate in this full up position. A mechanical latch 95 is provided for each carrier housing which includes a manually movable lever 96 having a locking lug 97 that can be pivoted into the notch of a retaining bracket 98 that is fixed to the cover plate 76 when the tailgate 15 is in the upper position. Normally, these latching devices 95 are maintained in the locked position to hold the tailgate in position against the carrier housings unless the tailgate is being operated up and down.

The operation of the lifting tailgate assembly 11 according to the invention should be readily apparent from the foregoing description. When it is desired to use the tailgate 15 in the lifting capacity, it is first released and pulled down to its level position like any conventional truck tailgate. However, instead of merely rotating the tailgate, the hinges extend it outwardly a significant distance from the truck bed 13 as it approaches the horizontal position. The manual latches 95 are then unlocked and the hand control 94 is operated to the down position. As the tailgate 15 lowers from the carrier housings it moves directly downward and since the hinges 17 have extended it outwardly, it avoids any interference with rear end equipment on the truck such as heavy duty bumpers 14. The load is placed on the tailgate preferably when it has engaged the ground and upon actuation of the control level. The actuator 23 operates in the opposite direction and raises the tailgate 15 as an elevating platform to its normal level which is substantially even with the truck bed. As the tailgate rises the control arms of the linkages 18 fold neatly into the carrier housings 18. Cargo can then be easily moved into the truck. When all lifting is completed, the hand locks 95 are moved back to the locking position and the tailgate 15 is closed in a normal manner.

From the foregoing it should be apparent that the present invention affords an efficient but relatively simple tailgate lifting assembly which is adaptable to a wide variety of truck type vehicles and suitable for a large number of uses.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A combination tailgate and lifting device for a truck type vehicle having a frame, a cargo bed and side wall members on opposite sides of the bed, said device comprising:

a pair of carrier support means;

hinge means connecting each said support means to the cargo bed;

means for retaining said carrier support means in a horizontally extended position;

a tailgate;

linkage means interconnecting each said carrier support means and said tailgate for extending said tailgate downwardly from said support means and comprised of a pair of upper and lower sections fixed at one end to a said carrier support member and said tailgate respectively, said sections being pivotally connected together at their other ends, both said upper and lower linkage sections comprising top and bottom parallel link bars, the top and bottom bars of said upper linkage section being pivotally connected to the bottom and top bars, respectively, of said lower linkage section and a short link interconnecting the two pairs of connected top and bottom link bars;

means for raising said tailgate relative to said carrier support means when the latter are in their horizontally extended position; and coordinating means connected to each pair of said upper and lower sections for controlling the angular position of said connected sections relative to each other as the linkage means is operated, thereby causing the tailgate to be lowered and raised substantially vertically with respect to the horizontally extended carrier support members.

2. A combination tailgate and lifting device for a truck type vehicle having a frame, a carbo bed and side wall members on opposite sides of the bed, said device comprising:

a pair of carrier support means;

hinge means connecting each said support means to the cargo bed;

means for retaining said carrier support means in a horizontally extended position;

a tailgate;

linkage means interconnecting each said carrier support means and said tailgate for extending said tailgate downwardly from said support means and comprised of a pair of upper and lower sections fixed at one end to a said carrier support member and said tailgate respectively, said section being pivotally connected together at their other ends;

coordinating means connected to each pair of said upper and lower linkage sections for controlling the angular position of said connected sections relative to each other as the linkage means is operated, thereby causing the tailgate to be lowered and raised substantially vertically with respect to the horizontally extended carrier support members, said coordinating means on each said linkage means comprising an arm fixed to and extending transversely from the end of said upper linkage section, and a coordinating link connected to said arm and to the lower linkage section for causing the pivotally connected linkage sections to move apart and close together at the same angular rate as the tailage is lowered and raised;

and means for raising said tailgate relative to said carrier support means when the latter are in their horizontally extended position.

3. A combination tailgate and lifting device for a truck type vehicle having a frame, a cargo bed and side wall members on opposite sides of the bed, said device comprising:

a pair of carrier support means;

hinge means connecting each said support means to the cargo bed;

means for retaining said carrier support means in a horizontally extended position;

a tailgate;

linkage means interconnecting each said carrier support means and said tailgate for extending said tailgate downwardly from said support means, said carrier support means comprising an elongated rigid body member having side walls forming a housing for said linkage means when the latter is fully retracted with the tailgate in the up position;

and means for raising said tailgate relative to said carrier support means when the latter are in their horizontally extended position.

4. The device as described in claim 3 wherein each said hinge means comprises a foldable linkage for extending the carrier support means outwardly away from the truck while rotating it from the vertical to the horizontal position when the tailgate is down, and which folds closely adjacent to the carrier support means when the tailgate is up.

5. The device as described in claim 4 wherein each said foldable hinge linkage comprises a four-bar linkage section and a three-bar linkage section connected to opposite walls of said carrier support means at one end and connected together at the other end by a fixed cross-link so as to operate in unison.

6. A combination tailgate and lifting device for a truck type vehicle having a frame, a cargo bed and side wall members on opposite sides of the bed, said device comprising:

a pair of carrier support means having elongated recesses;

hinge means connecting said support means to the truck bed;

a tailgate;

parallelogram linkage means interconnecting each said carrier support means and said tailgate, said linkage means being enclosed in said recesses when said tailgate is up and operable for extending said tailgate vertically from said support means when said tailgate is to be utilized for lifting;

and power means for raising said tailgate relative to said carrier support means when the latter are extended horizontally from the truck.

7. A tailgate lifting device adapted for installation on a truck type vehicle having a frame, a truck bed, side wall members on opposite sides of the bed and a tailgate, said device comprising:

a pair of carrier support means, each including a pair of sidewalls and a top forming an elongated housing;

hinge means connecting said support means to the truck bed;

a pair of extendible support arms connected to the truck side walls for holding said carrier support means in the horizontal position and outwardly from said truck;

a pair of linkage means each connected at one end to a said carrier support means and at the other end to said tailgate, said tailgate being otherwise disconnected from said truck, said linkage means being operable for extending said tailgate downwardly from said support means and being folded completely within said support means when the tailgate is in the retracted, up position;

and power means attached to said truck for raising said tailgate relative to said carrier support means when the latter are extended horizontally from the truck.

8. The device as described in claim 7 including a cover plate attached to the inner, upper surface of said tailgate and providing an anchoring member for the ends of said linkage means and said power means.

9. The device as described in claim 8 wherein said cover plate is secured by fastening means extending through said tailgate and by a curved edge portion extending along one side thereof.

10. The device as described in claim 7 wherein each said linkage means comprises a pair of upper and lower sections fixed at one end to a said carrier support member and said tailgate, respectively, said section being pivotally connected together at their other ends.

11. The device as described in claim 10 including a coordinating means connected to each pair of said upper and lower sections for controlling the angular position of said connected sections relative to each other as the linkage means is operated, thereby causing the tailgate to be lowered and raised substantially vertically with respect to the horizontally extended carrier support members.

12. The device as described in claim 7 wherein each said hinge means comprises a foldable linkage for extending the carrier support means outwardly away from the truck while rotating it from the vertical to the horizontal position when the tailgate is down, and which folds closely adjacent to the carrier support means when the tailgate is up.

13. The device as described in claim 7 including a manually operable lock means for securing said tailgate to said carrier support means.

14. The device as described is claim 7 wherein said means for raising said tailgate comprises: a pair of cables each attached at one end near one end of said tailgate; pulley means in each of said carrier support means, one of said cables extending partially around a said pulley and underneath the truck cargo bed; and controllable power means attached to said truck for pulling the other ends of said cables to raise said tailgate up to said carrier support means.

15. A combination tailgate and lifting device for a truck type vehicle having a frame, a cargo bed and side wall members on opposite sides of the bed, said device comprising:

a pair of carrier support means on said vehicle;

a tailgate;

a parallelogram linkage means interconnecting each said carrier support means and said tailgate for extending said tailgate downwardly from said support means, said carrier support means comprising an elongated rigid body member having side walls forming a housing for said linkage means when it is fully retracted with the tailgate in the up position;

and means for lowering and raising said tailgate relative to said carrier support means while the tailgate is maintained in a horizontally extended position.

References Cited

UNITED STATES PATENTS

| 2,110,239 | 3/1938 | Richter | 214—75 |
| 2,536,080 | 1/1951 | Patton | 214—75 |
| 2,698,103 | 12/1954 | Rostine | 214—75 |
| 3,021,963 | 2/1962 | Kasdorf et al. | 212—128 |

ROBERT G. SHERIDAN, *Primary Examiner.*